United States Patent [19]

Bagnara et al.

[11] Patent Number: 5,884,840
[45] Date of Patent: Mar. 23, 1999

[54] AUTOMATED VEHICLE WASHING SYSTEMS USING CONCENTRATED DETERGENTS

[75] Inventors: Thomas J. Bagnara, Crown Point, Ind.; Thomas J. Gibney, Naperville, Ill.

[73] Assignee: Turtle Wax, Inc, Chicago, Ill.

[21] Appl. No.: 909,241

[22] Filed: Aug. 11, 1997

Related U.S. Application Data

[63] Continuation-in-part of Ser. No. 296,775, Aug. 19, 1994, Pat. No. 5,655,713.

[51] Int. Cl.$^6$ ....................................................... B05B 7/30
[52] U.S. Cl. .................. 239/10; 134/99.21; 134/100.1; 134/123; 239/127; 239/310
[58] Field of Search ..................................... 239/310, 318, 239/340, 352, 750–753; 134/99.2, 100.1, 123; 251/903, 332

[56] References Cited

U.S. PATENT DOCUMENTS

| | | |
|---|---|---|
| 2,606,068 | 8/1952 | Bonacor . |
| 2,788,009 | 4/1957 | Lones . |
| 2,827,913 | 3/1958 | Wagner . |
| 3,147,767 | 6/1962 | Goss ......................................... 239/310 |
| 3,447,505 | 6/1969 | Wagner . |
| 3,613,997 | 10/1971 | Thompson ................................ 239/310 |
| 3,801,017 | 4/1974 | Jarzynski . |
| 4,382,552 | 5/1983 | Lubsen et al. . |
| 4,383,935 | 5/1983 | Hull . |
| 4,848,384 | 7/1989 | Christoper et al. . |
| 5,626,291 | 5/1997 | Flinn et al. .............................. 239/310 |
| 5,655,713 | 8/1998 | Gibney et al. ........................... 239/310 |

Primary Examiner—Andres Kashnikow
Assistant Examiner—Jorge S. Bocanegra
Attorney, Agent, or Firm—Baher + McKenzie

[57] ABSTRACT

Retrofit systems are provided to convert existing automated vehicle washing systems from using conventional car wash chemicals to highly concentrated chemicals. The retrofit systems enable a car wash operator to control the feed volume of concentrated chemicals that are fed to a spray arch where the chemicals are mixed with water before being sprayed on a vehicle. The system provided enables the operators of existing car washes to convert from conventional chemicals to highly concentrated chemicals without purchasing an excessive amount of new equipment or carrying out extensive modifications of existing equipment. A novel feature of the present invention includes the use of a concentrate feed control block for controlling the volume of highly concentrated chemicals delivered to the spray arch of the car wash where the chemical is diluted with water before being applied to a vehicle.

18 Claims, 2 Drawing Sheets

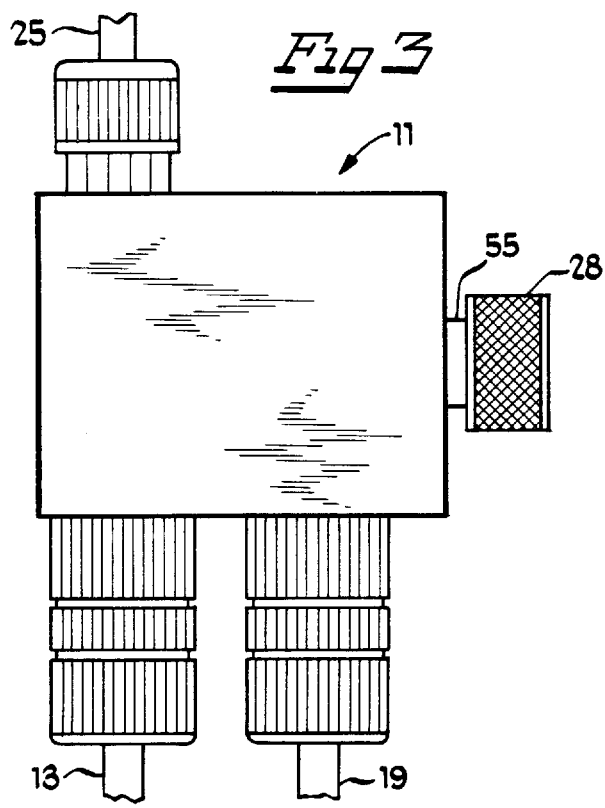
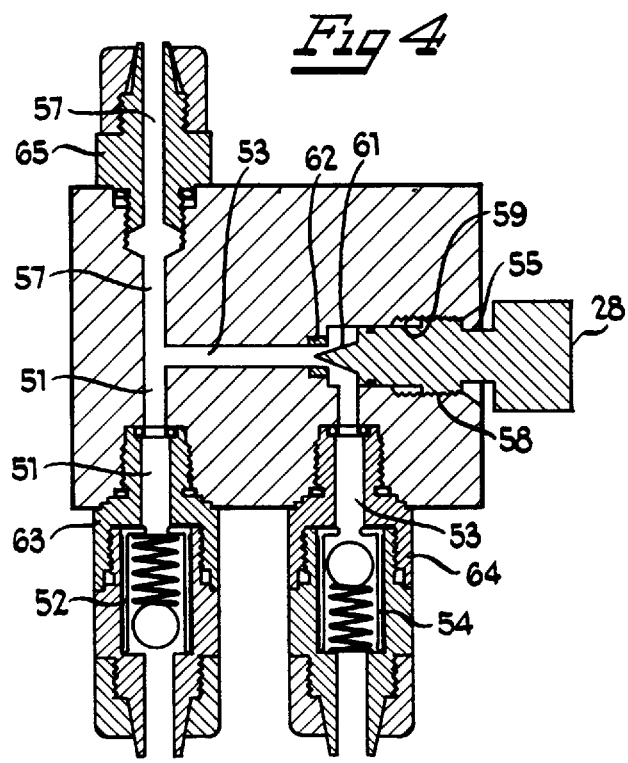

AUTOMATED VEHICLE WASHING SYSTEMS USING CONCENTRATED DETERGENTS

This application is a continuation-in-part of application Ser. No. 08/296,775, filed Aug. 26, 1994, now U.S. Pat. No. 5,655,713.

BACKGROUND OF THE INVENTION

1. Field of the Invention

This invention relates generally to automated systems for washing and waxing vehicles. More particularly, the invention relates to a modification or a retrofit to existing automated vehicle washing systems that enables operators of existing systems to switch over to new, highly concentrated cleaning and waxing chemicals while still employing the same basic equipment used for conventional, less concentrated chemicals.

2. Description of the Related Art

Chemicals used in automatic car washes are now available in highly concentrated formulas. However, most existing car wash equipment is designed to accommodate conventional, less concentrated chemicals. The present invention addresses the problem of converting automatic car washing equipment from conventional car cleaning and waxing chemicals to highly concentrated car cleaning and waxing chemicals without substantially replacing existing equipment or making expensive and time consuming modifications to the existing car washing equipment.

Existing North American car wash systems generally use conventional chemicals supplied in 55-gallon drums and European car washes generally use conventional chemicals supplied in 25 liter containers. The broad term "chemical" refers to detergents and other cleaning agents as well as to waxes, sealants and other conditioners. The chemicals are typically drawn out of the 55-gallon drum or 25 liter container with a pump, commonly referred to as a "feed pump" or a "direct feed pump", and then injected into an overhead "spray arch" of the car wash where they are mixed with water just before the chemical/water mixture is sprayed onto the vehicles.

While the chemical dilution capabilities of conventional spray arches have been satisfactory for washing systems employing conventional chemicals, the dilution capabilities of a conventional spray arch have proven to be insufficient for the highly concentrated chemicals now available. Specifically, conventional spray arches cannot achieve the high water to chemical dilution ratios required with highly concentrated chemicals and therefore, the use of highly concentrated chemicals with a conventional spray arch typically results in a chemical/water mixture having a relatively high concentration of chemicals. This leads to a substantial waste of the concentrated chemicals and makes it quite difficult to properly rinse the chemical/water mixture off of the vehicle after the cleaning step has been completed. Therefore, some modification of the existing vehicle washing systems is required before they can employ the more concentrated chemicals.

As noted above, the problem addressed by the present invention is how to retrofit or convert existing car wash facilities from using conventional detergents (supplied in 55-gallon drums or 25 liter containers) to highly concentrated detergents and waxes that may be in excess of ten times stronger or more concentrated than conventional chemicals. In essence, the conventional "direct feed pump" system discussed above is not capable of properly diluting the concentrated chemicals that are now available. Further, car wash operators will be very reluctant to convert from conventional detergents to highly concentrated detergents if an excessive amount of new equipment or modification of existing equipment is required. For example, the conventional direct feed pump of an existing vehicle washing system could theoretically be replaced with a commercially available precision low volume direct feed pump so that a precise low volume portion of concentrated chemical could be fed into the spray arch of the washing system. However, the cost of purchasing and installing a precision low volume feed pump would greatly outweigh the benefits of using concentrated chemicals. Therefore, there is a continuing need for equipment and methods that allow an existing vehicle washing system to be cost effectively modified so that the system can employ highly concentrated chemicals.

The proposed conversion from conventional chemicals provided in 55-gallon drums or 25 liter containers to highly concentrated chemicals provided in 5-gallon containers or 4 liter containers provides many ancillary benefits for car wash operations. First, the car wash operator will no longer be responsible for disposing of the 55-gallon drums or 25 liter containers which normally cannot be deposited in a normal trash bin. In addition, while 55-gallon drums are reusable, they are not recyclable.

Further, from the chemical manufacturer's point of view, to be able to supply concentrated chemicals in a 5-gallon container or 4 liter container, which may include a plastic bag of chemicals enclosed in a protective cardboard box, is highly desirable. First, sales personnel or account representatives can carry the boxes of chemicals in the trunk of a sedan; a truck or van for delivering the chemicals to car wash operators is not required. Second, the account representatives can move, replace and install the smaller boxes of highly concentrated chemicals is without assistance. In contrast, 55-gallon drums can weigh as much as 500 pounds which requires two or more people to move a 55-gallon drum full of chemicals. Workplace injuries as a result of moving of heavy objects such as a full 55-gallon drum can be avoided. Likewise, 25 liter containers may be quite heavy. Further, no special arrangements for the disposal of empty concentrate boxes or bags need to be made. The plastic bags held with the boxes can be recycled, as well as the cardboard box.

Thus, while the conversion from conventional car wash chemicals to highly concentrated chemicals provides benefits to both the chemical manufacturer and car wash operators, car wash operators will be reluctant to convert to the highly concentrated chemicals if a substantial amount of new equipment or modification to existing equipment is required in order to convert from the regular strength chemicals to the concentrated chemicals. The present invention specifically addresses this problem and provides a means for converting existing car wash operations from conventional chemicals to concentrated chemicals without an excessive amount of new equipment or modification to existing equipment.

SUMMARY OF THE INVENTION

The present invention satisfies the foregoing needs of car wash operators by providing an inexpensive mechanism for controlling the volume of highly concentrated car wash chemicals that are delivered to the spray arch of existing car wash facilities. As a result, the concentrated chemicals can be used with the equipment in place at an existing vehicle washing facility without an excessive amount of modification to the equipment.

Specifically, the present invention provides a means for controlling the volume of concentrated chemicals delivered to the overhead spray arch of a car wash before the concentrated chemicals are mixed with water in the spray arch and the fully diluted concentrates are sprayed onto a vehicle. The modification to the existing car wash equipment is minimal and the new equipment is add-on equipment which relates to the concentrated chemical delivery steps only. The modifications required by the present application do not effect the pump systems which pump the concentrate to the spray arch or any of the valves or fittings relating to the spray arch. Therefore, there is no need to replace the pump systems and the spray arch in the existing car wash.

The automated vehicle washing system of the present invention includes a concentrate reservoir connected to an inlet port of a feed pump. An outlet port of the feed pump is connected to a concentrate input passage of a concentrate feed control block. Inside the concentrate feed control block, the concentrate input passage divides into a concentrate output passage and a concentrate bypass passage. The concentrate output passage feeds a first portion of the concentrate to a spray arch where the concentrate is diluted with water and sprayed onto a vehicle. The concentrate bypass passage feeds a second portion of the concentrate out of the concentrate feed control block and back into the concentrate reservoir. The concentrate feed control block also includes a means for controlling the flow of concentrate in the concentrate bypass passage. Preferably, the means for controlling the bypass flow is a stem valve that controls the bypass flow rate of the concentrate. It will also be noted that, by controlling flow through one channel (i.e., the bypass passage), one also indirectly controls the flow through the second channel (i.e., the concentrate output passage).

The present invention also lends itself to improved methods for retrofitting existing car washes. Specifically, an account representative can easily supply the car wash operator with a concentrate feed control block and a 5 gallon or 4 liter container or a concentrate reservoir in the form of a secondary container which is preferably large enough (15 gallons or 12 liters) to hold from two to three 5-gallon or 4 liter bag-in-a-box containers of concentrate. The concentrate input passage of the concentrate feed control block is then connected to an outlet port of a feed pump which would already be in place because it would be previously used to draw chemicals out of the 55-gallon drum or 25 liter container. The concentrate bypass passage of the concentrate feed control block is then connected to the concentrate reservoir. The concentrate output passage of the concentrate feed control block is then connected to an injection valve that is mounted at the spray arch. The spray arch mixes water with the concentrate to create a diluted chemical/water mixture for application to the vehicles.

Thus, an improved system and method for retrofitting existing automated vehicle washing systems is provided that enables an existing system to convert from conventional chemicals to highly concentrated chemicals. The only equipment that the car wash operator or the account representative must supply is a concentrate feed control block and the concentrate box or reservoir. Clearly, it is substantially easier for the account representative to supply a concentrate box than conventional chemicals which are normally provided in a heavy, bulky 55-gallon drum or 25 liter container.

It is therefore an object of the present invention to provide an improved system for delivering highly concentrated chemicals for use in automated vehicle washing systems.

It is another object of the present invention to provide an improved retrofit kit for enabling existing automated vehicle washing systems to convert from conventional chemicals to highly concentrated chemicals.

Yet another object of the present invention is to provide an improved method of retrofitting or converting existing automated vehicle washing systems from using conventional chemicals to highly concentrated chemicals.

BRIEF DESCRIPTION OF THE DRAWINGS

These and other features, aspects, objects, and advantages of the present invention will become better understood upon consideration of the following detailed description, appended claims and accompanying drawings where:

FIG. 3 is a side view of the concentrate feed control block first shown in FIG. 2 as made in accordance with the present invention; and FIG. 4 is a sectional view of the concentrate feed control block shown in FIG. 3.

Figure 1:
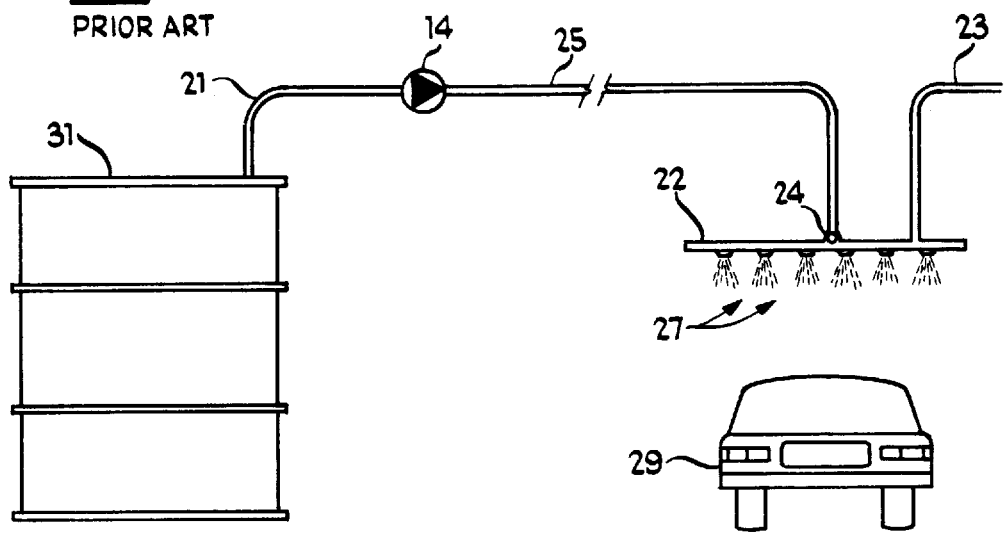
FIG. 1 is a schematic illustration of an automated vehicle washing system found in the prior art, particularly illustrating the use of conventional chemicals provided in a large drum.

It should be understood that the invention is illustrated more or less diagrammatically in the drawings and that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DESCRIPTION OF THE PREFERRED EMBODIMENTS

Referring now to FIG. 1, there is shown a version of an automated vehicle washing system known in the art. This vehicle washing system, which would be common in a North American car wash, includes a feed pump 14 which draws a conventional chemical out of a 55-gallon drum 31 through a conduit 21. Alternatively, an existing European car washing system would generally include a 25 liter container instead of a 55-gallon drum. The feed pump 14 then pumps the conventional chemical through a conduit 25 to an injection valve 24. The injection valve 24 injects the conventional chemical into a spray arch 22 where it is mixed with water which is pumped from a main water supply through a conduit 23. The mixture of concentrate and water is then forced through spray nozzles 27 and onto a vehicle 29.

Figure 2:
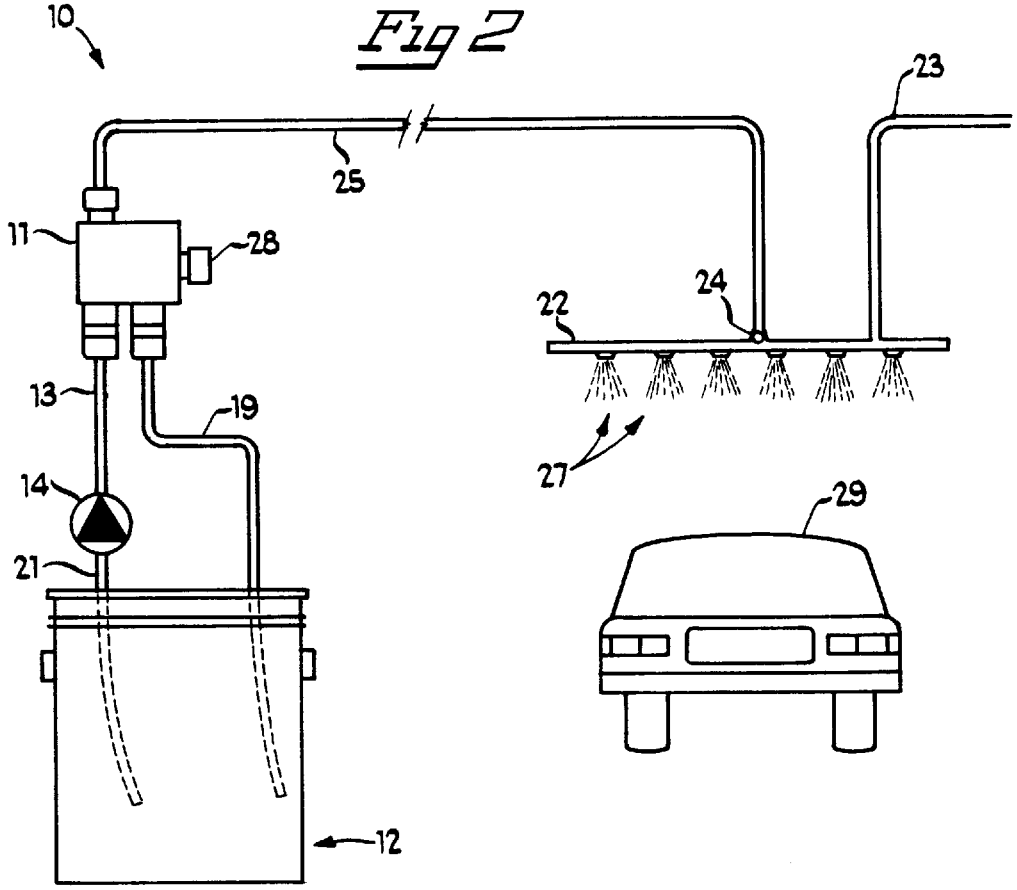
FIG. 2 is a schematic view of an automated vehicle washing system in accordance with the present invention, particularly illustrating a means for controlling the volume of highly concentrated chemicals delivered to the spray arch of a vehicle washing system.

FIG. 2 is an illustration of an automated vehicle washing system 10 according to the present invention. The vehicle washing system 10 of the present invention employs a concentrate feed control block 11 and a highly concentrated chemical, or concentrate, which can be provided in a concentrate reservoir 12 or in a self-contained bag-in-a-box container. The concentrate is drawn upward through conduit 21 under the pressure drop created by the feed pump 14. The concentrate is then pumped forward by the feed pump 14 through conduit 13 and into concentrate feed control block 11.

A first portion of the concentrate that has been pumped into the concentrate feed control block 11 continues on through the feed control block 11 and is pumped through conduit 25 and the injection valve 24. After exiting the injection valve 24, the concentrate is mixed in the spray arch 22 with water from the main water supply which is pumped from conduit 23 into the spray arch 22. The mixture of concentrate and water is forced through spray nozzles 27 and onto the vehicle 29.

A second portion of the concentrate that has been pumped into the feed control block 11 is pumped out of the feed control block 11 and through conduit 19 back into concentrate reservoir 12. In this manner, only the first portion of the concentrate that is pumped from the feed pump 14 into the concentrate feed control block 11 is pumped into the spray arch 22 and diluted with water before being applied to a vehicle. The second portion of concentrate, which corresponds to the amount of concentrate fed from the feed pump minus the first portion of concentrate fed to the spray arch, is returned to the concentrate reservoir 12.

Turning to FIGS. 3 and 4, the concentrate feed control block shown at 11 in FIG. 2 is illustrated in greater detail. Concentrate enters the block 11 through a concentrate input passage 51. Before concentrate enters the concentrate input passage 51, it passes through a check valve 52 which prevents any reverse flow of concentrate downward through the concentrate input passage 51 toward the concentrate reservoir 12 (see FIG. 2). Concentrate input passage 51 is connected to a concentrate bypass passage 53 and a concentrate output passage 57.

After the concentrate has passed through the concentrate input passage 51, a first portion of the concentrate enters the concentrate output passage 57 and a second portion of the concentrate enters the concentrate bypass passage 53. The volume of the first portion of concentrate entering the concentrate output passage 57 and the volume of the second portion of the concentrate entering the concentrate bypass passage 53 are regulated by means of a stem or needle valve 55.

In the concentrate feed control block 11 illustrated in FIG. 4, it can been seen that the stem or needle valve 55 is provided to control the flow of concentrate through the concentrate bypass passage 53. The stem valve 55 includes threads 58 which engage a threaded opening 59 of the concentrate feed control block 11. To close the stem valve 55 and prevent flow of concentrate through the concentrate bypass passage 53, the operator twists the knurled knob 28 so as to move the stem or needle valve 55 to the left as shown in FIG. 4 so that a lower end 61 of the stem valve 55 will engage a valve seal 62. It can be appreciated that by adjusting the flow of concentrate through the concentrate bypass passage 53, the flow of concentrate through the concentrate output passage 57 is also simultaneously adjusted as the concentrate bypass passage 53 and the concentrate output passage 57 both receive concentrate from the concentrate input passage 51. By carefully adjusting the stem valve 55, the first portion of concentrate that passes through the concentrate output passage 57 and the second portion of concentrate that passes through the concentrate bypass passage 53 can be controlled.

The advantages of retrofitting an existing vehicle washing system with a concentration feed control block so that the system may effectively use concentrated chemicals can be readily illustrated. Typically, the direct feed pump used in a vehicle washing system is a conventional high volume pump. As used herein, the term "high volume pump" refers to a pump that feeds more than 10–15 milliliters of liquid in a 30 second period. In other words, the high volume pump used in an existing vehicle washing system generally cannot deliver less than about 10 milliliters of liquid in a 30 second time span. In a typical vehicle washing cycle, solution is sprayed onto a vehicle from a spray arch for about a 30 second time span; therefore, at least 10–15 milliliters of a conventional chemical are usually delivered to the spray arch during one washing cycle.

Highly concentrated chemicals are added to the spray arch in much lower dosages than conventional chemicals. For example, it is recommended that certain concentrated chemicals be added to the spray arch in a dosage of approximately 3 milliliters per 30 second time span. Therefore, if this specific concentrated chemical is fed to the spray arch by a high volume feed pump as used in a typical car wash, 10–15 milliliters of the concentrated chemical will be injected into the spray arch in a 30 second time span. However, it can be seen that this dosage of concentrated chemical would be 3 to 5 times greater than the recommended dosage. This overfeed of concentrated chemical would lead to waste and the aforementioned rinsing problems.

As mentioned above, the overfeed of concentrated chemicals to a spray arch could be solved by replacing the conventional high volume direct feed pump with a commercially available precision low volume direct feed pump so that a precise low volume dosage of concentrated chemical could be fed into the spray arch of the washing system. However, as noted above, the cost of purchasing and installing a precision low volume feed pump may outweigh the benefits of using concentrated chemicals. In addition, certain vehicle washing installations may include a number of high volume feed pumps dedicated to feeding different chemicals; therefore, it is possible that a car wash operator would have to replace more than one high volume feed pump with an expensive precision low volume feed pump. This would further increase the costs of modifying the vehicle washing system.

The present invention provides an alternative solution to the problem of the overfeeding of concentrated chemicals to a spray arch in an existing vehicle washing system. By installing the concentrate feed control block 11 as shown in FIGS. 2–4 and described above, a low volume dosage of a concentrated chemical can be fed to the spray arch using the high volume feed pump already in use in the vehicle washing system. As seen in FIGS. 2–4, the concentrate that leaves the outlet port of the high volume feed pump 14 flows into the concentrate input passage 51 of the concentrate feed control block 11. After the concentrate has passed through the concentrate input passage 51, a first portion of the concentrate enters the concentrate output passage 57 and a second portion of the concentrate enters the concentrate bypass passage 53. As detailed above, by carefully adjusting the stem valve 55, the first portion of concentrate that passes through the concentrate output passage 57 and the second portion of concentrate that passes through the concentrate bypass passage 53 can be controlled.

In the example set forth above, the high volume feed pump would feed at least 10 milliliters per 30 second time span to the spray arch, even though the recommended feed of concentrated chemical is 3 milliliters per 30 second time span. Therefore, the feed pump would be feeding at least 7 milliliters excess chemical to the spray arch. However, by installing the concentrate feed control block 11 between the feed pump 14 and spray arch 22 and by adjusting the stem valve 55 of the concentrate feed block 11 accordingly, the excess 7 milliliters of chemical would not be fed to the spray arch 22. Specifically, at least 10 milliliters of concentrated chemical would leave the feed pump 14 and pass through the concentrate input passage 51 of the concentrate feed control block 11 in 30 seconds. However, the stem valve would be adjusted so that upon leaving the concentrate input passage 51, 3 milliliters of concentrate would pass through the concentrate output passage 57, and 7 milliliters of concentrate would pass through the concentrate bypass passage 53. The 3 milliliters of concentrate would then continue on to the spray arch 22 for dilution with water and application to a vehicle, and the 7 milliliters of excess feed volume of the concentrated chemical would exit the concentrate feed control block 11 through the concentrate bypass passage 53 and would be returned to the concentrate reservoir 12 by way of conduit 19. Optionally, another check valve 54 could be provided to prevent reverse flow of concentrate upward through conduit 19 and into the concentrate feed control block 11. It can also be appreciated that the use of an adjustable stem valve 55 to control the flow of concentrate in the concentrate feed control block 11 allows the operator to control concentrate flow even when variations in concentrate viscosities and pump settings are experienced.

Therefore, the concentrate feed control block 11 enables conventional existing vehicle washing systems to be cost effectively retrofitted so that concentrated chemicals may be used with the system. Comparing FIGS. 1 and 2, one can also see how easy it is to install the system of the present invention shown in FIG. 2. It is evident that only minor modifications need to be made to the prior art vehicle washing system of FIG. 1 in order to implement the system 10 of the present invention shown in FIG. 2. The retrofit is fast, easy and inexpensive, all of which will be greatly appreciated by car wash operators.

The method of installing the vehicle washing system 10 shown in FIG. 2 in an existing vehicle washing system as shown in FIG. 1 is as follows. First, the conduit 21 which is connected to an inlet port of the feed pump 14 is removed from the 55-gallon drum or 25 liter container of conventional chemicals (see FIG. 1) and is placed in the concentrate reservoir 12 or in a 5-gallon or 4 liter bag-in-a-box container. The conduit 25 which is connected to the outlet port of the feed pump 14 is removed from the feed pump and attached to the output fitting 65 of the concentrate feed control block 11. One end of an additional conduit 13 is then connected to the concentrate feed control block 11 at fitting 63 and the other end of conduit 13 is connected to the outlet port of the feed pump 14. One end of an additional conduit 19 is then connected to the concentrate feed control block 11 at fitting 64 and the other end of conduit 19 is placed in the concentrate reservoir 12. The hook-up of the conduit 25 to the spray arch 22 is already in place and accordingly, the automated vehicle washing system of the present invention is ready for use.

Thus, an improved method of retrofitting existing car wash systems to accommodate hyper or highly concentrated detergents is provided. All of the equipment needed to complete the retrofit is inexpensive. The system shown in FIG. 2 will make it easy for the manufacturers of highly concentrated chemicals to convince car wash operators to switch from the conventional chemicals provided in a 55-gallon drum or 25 liter container to the highly concentrated chemicals provided in a 5 gallon or 4 liter bag-in-a-box container. The method of retrofitting an existing vehicle washing system would be particularly advantageous in installations where a number of feed pumps and spray arches are used as the modifications to the feed line associated with each pump could be made without the need for expensive replacement equipment.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A system for washing vehicles comprising:

a concentrate reservoir containing concentrate;

a feed pump including an inlet port and an outlet port, the inlet port of the feed pump being in fluid communication with the concentrate reservoir;

a concentrate feed control block including a concentrate input passage, a concentrate bypass passage and a concentrate output passage, the concentrate output passage and the concentrate bypass passage being connected to the concentrate input passage, the concentrate input passage being in fluid communication with the outlet port of the feed pump, the concentrate bypass passage being in fluid communication with the concentrate reservoir, and the concentrate feed control block including means for regulating a flow of concentrate through the concentrate bypass passage;

a spray arch including a concentrate input passage and a water input passage, the concentrate input passage of the spray arch being in fluid communication with the concentrate output passage of the concentrate feed control block, the water input passage of the spray arch being in fluid communication with a water supply, the concentrate from the concentrate input passage of the spray arch being mixed with water from the water supply in the spray arch before passing out of the spray arch through a plurality of spray nozzles, whereby a first amount of concentrate is pumped from the concentrate reservoir into the concentrate feed control block, and the means for regulating the flow of concentrate through the concentrate bypass passage is adjusted so that a predetermined amount of concentrate is pumped into the spray arch and a second amount of concentrate substantially equal to the first amount of concentrate less the predetermined amount of concentrate is pumped through the concentrate bypass passage and back into the concentrate reservoir.

2. The system of claim 1 wherein the means for regulating the flow of concentrate through the concentrate bypass passage is a valve including a threaded stem valve that is threadably connected to the concentrate feed control block, a lower end of the threaded stem valve extending into the concentrate bypass passage, the concentrate bypass passage further including a seal for engaging the lower end of the threaded stem valve to shut off the flow of concentrate through the concentrate bypass passage.

3. The system of claim 2 wherein the concentrate input passage of the concentrate feed control block includes a check valve to prevent flow of concentrate from the concentrate feed control block toward the concentrate reservoir.

4. The system of claim 3 wherein the concentrate bypass passage of the concentrate feed control block includes a check valve to prevent flow of concentrate from the concentrate reservoir toward the concentrate feed control block.

5. The system of claim 4 wherein the concentrate input passage of the spray arch includes an injection valve to inject the concentrate into the spray arch where it is mixed with water and to prevent flow of diluted concentrate from the spray arch toward the concentrate feed control block.

6. The system of claim 5 wherein the concentrate reservoir comprises a 5 gallon container.

7. The system of claim 5 wherein the concentrate reservoir comprises a 4 liter container.

8. The system of claim 5 wherein the concentrate reservoir comprises a reusable 15 gallon container.

9. The system of claim 5 wherein the concentrate reservoir comprises a reusable 12 liter container.

10. A method of retrofitting an existing vehicle washing system to accommodate concentrated vehicle cleaning and waxing chemicals, the existing vehicle washing system including a feed pump for drawing a conventional chemical from a container and for feeding the conventional chemical to a spray arch connected to a water supply, the method comprising the following steps:

providing a concentrate reservoir containing at least one chemical concentrate;

providing a concentrate feed control block including a concentrate input passage, a concentrate bypass passage and a concentrate output passage, the concentrate output passage and the concentrate bypass passage being connected to the concentrate input passage, the concentrate feed control block including means for regulating a flow of concentrate through the concentrate bypass passage;

installing a first conduit between the concentrate reservoir and an inlet port of the feed pump;

installing a second conduit between an outlet port of the feed pump and the concentrate input passage of the concentrate feed control block;

installing a third conduit between the concentrate bypass passage of the concentrate feed control block and the concentrate reservoir; and installing a fourth conduit between the concentrate output passage of the concentrate feed control block and a concentrate input passage of the spray arch, whereby the spray arch applies a mixture of concentrate and water onto vehicles.

11. The method of claim 10 wherein the means for regulating the flow of concentrate through the concentrate bypass passage is a valve including a threaded stem valve that is threadably connected to the concentrate feed control block, a lower end of the threaded stem valve extending into the concentrate bypass passage, the concentrate bypass passage further including a seal for engaging the lower end of the threaded stem valve to shut off the flow of concentrate through the concentrate bypass passage.

12. The method of claim 11 wherein the concentrate input passage of the concentrate feed control block includes a check valve to prevent flow of concentrate from the concentrate feed control block toward the concentrate reservoir.

13. The method of claim 12 wherein the concentrate bypass passage of the concentrate feed control block includes a check valve to prevent flow of concentrate from the concentrate reservoir toward the concentrate feed control block.

14. The method of claim 13 wherein the concentrate input passage of the spray arch includes an injection valve to inject the concentrate into the spray arch where it is mixed with water and to prevent flow of diluted concentrate from the spray arch toward the concentrate feed control block.

15. The method of claim 14 wherein the concentrate reservoir comprises a 5 gallon container.

16. The method of claim 14 wherein the concentrate reservoir comprises a 4 liter container.

17. The method of claim 14 wherein the concentrate reservoir comprises a reusable 15 gallon container.

18. The method of claim 14 wherein the concentrate reservoir comprises a reusable 12 liter container.

* * * * *